United States Patent
Ahuja et al.

(10) Patent No.: US 10,955,158 B2
(45) Date of Patent: *Mar. 23, 2021

(54) REGULATING ENVIRONMENTAL CONDITIONS WITHIN AN EVENT VENUE

(71) Applicant: International Business Machines Corporation, Armonk, NY (US)

(72) Inventors: Karan Ahuja, New Delhi (IN); Heena Bansal, New Delhi (IN); Kuntal Dey, New Delhi (IN); Seema Nagar, Bangalore (IN); Roman Vaculin, Bronxville, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/733,812

(22) Filed: Jan. 3, 2020

(65) Prior Publication Data

US 2020/0141598 A1    May 7, 2020

Related U.S. Application Data

(63) Continuation of application No. 15/836,802, filed on Dec. 8, 2017, now Pat. No. 10,563,880, which is a (Continued)

(51) Int. Cl.
*F24F 11/30* (2018.01)
*G05B 13/04* (2006.01)
(Continued)

(52) U.S. Cl.
CPC ............. *F24F 11/30* (2018.01); *F24F 11/62* (2018.01); *G05B 13/042* (2013.01); *G05B 15/02* (2013.01);
(Continued)

(58) Field of Classification Search
CPC ...... G06N 20/00; G05B 13/042; G05B 15/02; G05B 2219/2614; G05B 2219/2642;
(Continued)

(56) References Cited

U.S. PATENT DOCUMENTS 6,645,066 B2    11/2003    Gutta et al.
8,510,255 B2    8/2013    Fadell et al.
(Continued)

OTHER PUBLICATIONS

U.S. Appl. No. 15/836,802, filed Dec. 8, 2017.
(Continued)

*Primary Examiner* — Robert E Fennema
*Assistant Examiner* — Christopher W Carter
(74) *Attorney, Agent, or Firm* — Amin, Turocy & Watson, LLP

(57) ABSTRACT

A venue occupant comfort system, comprises a processor that stores computer executable components stored in memory. A plurality of sensors sense ambient conditions associated with exterior and interior conditions of a venue. A context component infers or determines context of an occupant of the venue. A crowd estimation component infers, based at least in part on mining social networks, size of crowd expected at the venue. A comfort model component implicitly and explicitly trained on occupant comfort related data analyzes information from the plurality of sensors, the crowd estimation component and context component. A comfort controller adjusts environmental conditions of the venue based at least in part on output of the comfort model component. The adjustments to venue environment can optionally be differentiated by zone.

20 Claims, 5 Drawing Sheets

Related U.S. Application Data continuation of application No. 15/407,939, filed on Jan. 17, 2017, now Pat. No. 10,571,143.

(51) Int. Cl.

| | |
|---|---|
| *F24F 11/62* | (2018.01) |
| *G06N 20/00* | (2019.01) |
| *G05B 15/02* | (2006.01) |
| *F24F 110/12* | (2018.01) |
| *F24F 140/50* | (2018.01) |
| *F24F 120/12* | (2018.01) |
| *F24F 110/50* | (2018.01) |
| *F24F 110/10* | (2018.01) |
| *F24F 11/65* | (2018.01) |
| *F24F 110/20* | (2018.01) |
| *F24F 11/58* | (2018.01) |
| *F24F 11/64* | (2018.01) |
| *F24F 120/20* | (2018.01) |

(52) U.S. Cl.
CPC ............... *G06N 20/00* (2019.01); *F24F 11/58* (2018.01); *F24F 11/64* (2018.01); *F24F 11/65* (2018.01); *F24F 2110/10* (2018.01); *F24F 2110/12* (2018.01); *F24F 2110/20* (2018.01); *F24F 2110/50* (2018.01); *F24F 2120/12* (2018.01); *F24F 2120/20* (2018.01); *F24F 2140/50* (2018.01); *G05B 2219/2614* (2013.01); *G05B 2219/2642* (2013.01)

(58) Field of Classification Search
CPC ........ F24F 11/30; F24F 11/62; F24F 2110/20; F24F 2110/50; F24F 2120/20; F24F 2140/50; F24F 11/64; F24F 2120/12; F24F 11/65; F24F 2110/10; F24F 2110/12; F24F 11/58
USPC ........................................................ 700/276
See application file for complete search history.

(56) References Cited

U.S. PATENT DOCUMENTS

| | | | |
|---|---|---|---|
| 8,768,867 | B1 | 7/2014 | Thaeler et al. |
| 9,148,392 | B1 | 9/2015 | Kelly et al. |
| 2006/0251338 | A1 | 11/2006 | Gokturk et al. |
| 2008/0180228 | A1 | 7/2008 | Inakefiled et al. |
| 2008/0300937 | A1 | 12/2008 | Allen et al. |
| 2012/0242492 | A1 | 9/2012 | Grunfeld |
| 2013/0073094 | A1 | 3/2013 | Knapton et al. |
| 2013/0246526 | A1 | 9/2013 | Wu et al. |
| 2013/0310987 | A1 | 11/2013 | Sobek et al. |
| 2014/0358291 | A1 | 12/2014 | Wells |
| 2014/0365017 | A1 | 12/2014 | Hanna et al. |
| 2015/0356693 | A1 | 2/2015 | Wiseman et al. |
| 2015/0227851 | A1 | 8/2015 | Kaisser |
| 2016/0016454 | A1 | 1/2016 | Yang et al. |
| 2016/0089955 | A1 | 3/2016 | Ham |
| 2016/0131383 | A1 | 5/2016 | Zhao et al. |
| 2016/0170998 | A1 | 6/2016 | Frank et al. |
| 2016/0189181 | A1 | 6/2016 | McClave et al. |

OTHER PUBLICATIONS

U.S. Appl. No. 15/407,939, filed Jan. 17, 2017.
Sinnot, R., et al., "Estimating Crowd Size through Social Media," First IEEE International Workshop on Benchmarks or Ubiquitous Crowdsourcing: Metrics, Methodologies, and Datasets, 2016, 6 pages.
Liu, G., et al., "Demo Abstract: Model-Free Occupancy-Based Control of Variable-Air-Volume Terminal Boxes," BuildSys '14, Nov. 5-8, 2014, pp. 186-187.
Non-Final Office Action received for U.S. Appl. No. 15/407,939 dated May 4, 2018, 26 pages.
Final Office Action received for U.S. Appl. No. 15/407,939 dated Nov. 1, 2018, 22 pages.
List of IBM Patents or Applications Treated as Related.
Non-Final Office Action received for U.S. Appl. No. 15/836,802 dated Jan. 8, 2019, 26 pages.
Non Final Office Action received for U.S. Appl. No. 15/407,939 dated May 24, 2019, 34 pages.
Final Office Action received for U.S. Appl. No. 15/836,802 dated May 24, 2019, 28 pages.

ns, or in the Detailed Description section.

REGULATING ENVIRONMENTAL CONDITIONS WITHIN AN EVENT VENUE

BACKGROUND

The subject disclosure generally relates to machine learning systems and in particular to utilizing machine learning systems to regulate environmental conditions within a venue based on predictive crowd estimation.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later.

One embodiment of the invention is a system, comprising a memory storing one or more computer readable and executable components; a processor operably coupled to the memory and that executes the computer readable and executable components stored in the memory; the components comprising: a crowd estimation component that infers size of a crowd expected to occupy the venue based in part on data obtained from one or more social networks; a comfort model component, trained on crowd comfort related data, that analyzes information from the crowd estimation component; and a comfort controller that adjusts environmental conditions of the venue interior based at least in part on output from the comfort model component.

Other embodiments include a computer-implemented method and a computer program product.

In some embodiments, elements of one or more computer-implemented methods can be embodied in different (or a combination of) forms. For example, one or more elements of a computer-implemented method may be embodied (without limitation) as (or with) a system, a computer program product, and/or another form.

DETAILED DESCRIPTION

Figure 1:
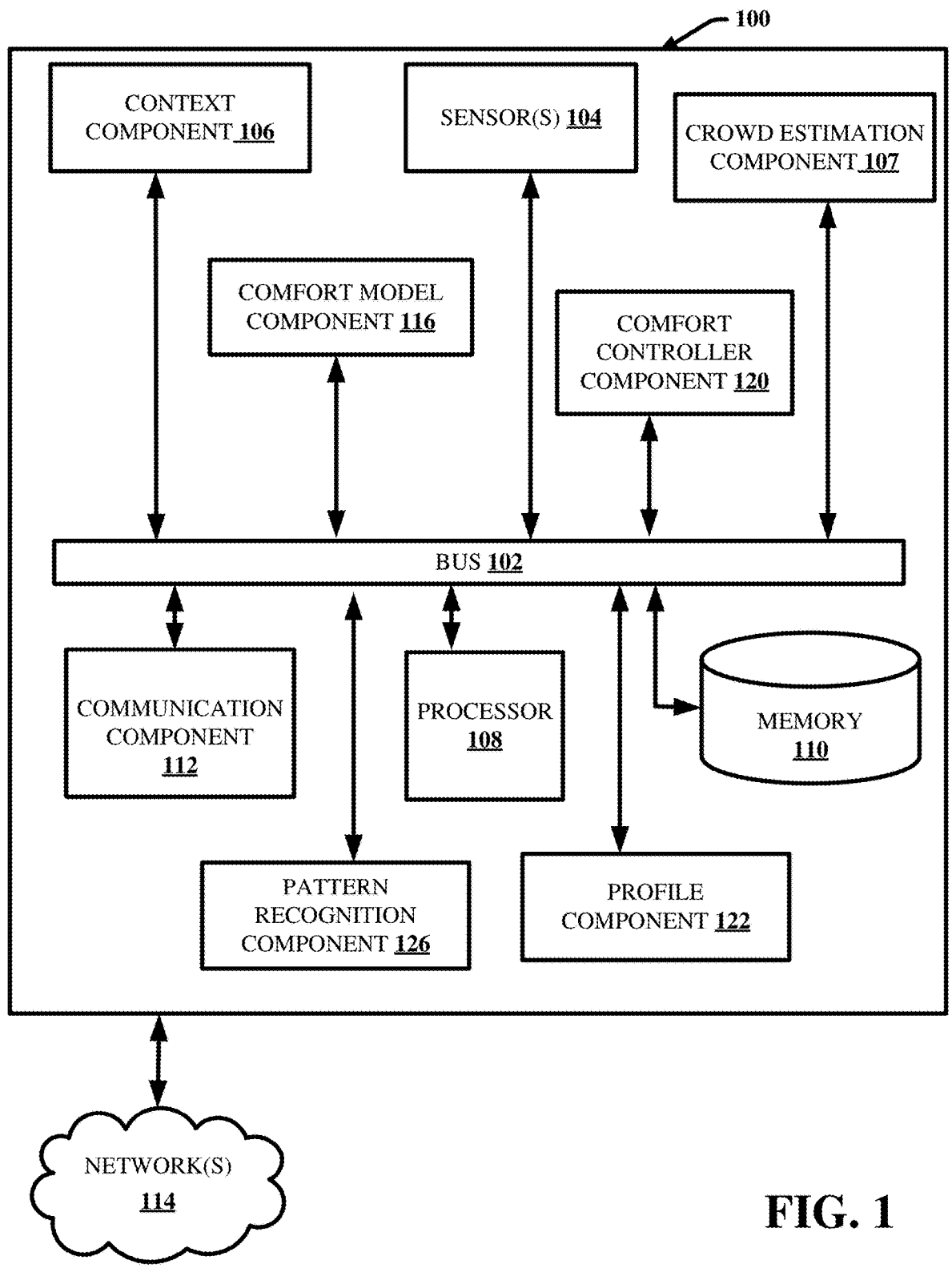
FIG. 1 illustrates a block diagram of an example, non-limiting system that utilizes machine learning systems, in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

One or more embodiments of the subject disclosure describes utilizing machine learning systems to mine social network sites in connection with inferring a number of occupants that will visit a venue, and to accordingly regulate environmental conditions within the venue to improve occupant(s) comfort. The machine learning systems can be explicitly or implicitly trained. For example, over time, some embodiments can employ feedback to learn from an actual number and demographics of attendees compared to that inferred by the machine learning system. Accordingly, over time, the machine learning systems can converge on higher confidence levels through such learning.

Concert halls, theaters, arenas, indoor stadiums, banquet halls, auditoriums, exercise facilities, recreation centers and the like are venues typically occupied by groups of individuals that desire to share or participate in a common experience. Research shows that occupant comfort within a venue might be spoiled due to various reasons, including foul air, uncomfortable temperature and humidity, air flow level, sound levels, lighting levels, etc. Venues are typically equipped with various comfort facilities (e.g. air conditioners, lighting control, sound control, heating, ventilation and air conditioning (HVAC) systems, etc.). There is opportunity to improve venue comfort by adjusting these facilities, but there is a requirement of external trigger(s) from human(s) or smart control system(s). Some technologies are developed to automatically adjust venue temperature in reaction to a sensed change in the environmental context (e.g., to activate the air conditioner when the temperature is sensed as exceeding a pre-set desired temperature, or to activate the heating system in reaction to sensing that the temperature has dropped below a pre-set desired temperature). Such automatic adjustments, however, are typically not proactive, e.g., they are triggered in response to a sensed change in the environment Thus, conventional venue environmental systems are relatively static and reactive e.g., typically involving a maintenance person setting a desired temperature, and the venue temperature control system will work towards achieving and maintaining the set temperature until a new temperature is set by the maintenance person. A consequence of such systems are that manual intervention is often required in order to achieve occupant satisfaction. Furthermore, venues can often be very large (e.g., seat over 40,000 people) and consequently consume significant resources in connection with environmental regulation (e.g., temperature, humidity, circulation, filtering, etc.) and achieving a desired set of environmental conditions can take hours. Maintenance people might not be aware of the number of occupants attending an event at the venue let alone arrival time or occupant preferences or context. Innovations described herein leverage information gleaned through mining social networks to facilitate predicting size of crowds attending an event, arrival times, occupant demographics, preferences, context, etc. Further to that mentioned above, in some embodiments, machine learning systems can be explicitly or implicitly trained in accordance with the present invention. In other words, feedback can be employed over time, to analyze and learn from experiences based on an actual number and demographics of attendees versus that predicted by the machine learning system. Accordingly, over time the machine learning systems (through such training) can converge on higher confidence levels regarding a predicted of number of attendees and their respective demographics.

Accordingly, in some embodiments utilizing information obtained in connection with an explicitly and/or implicitly trained model, a venue's environment can be regulated in advance to facilitate achieving appropriate environmental settings for the occupants as well as facilitate efficient use of venue resources.

Some embodiments utilize machine learning systems that have been explicitly or implicitly trained to learn, based on determined and/or inferred occupant comfort, and can dynamically regulate environmental conditions of the venue to facilitate achieving occupant comfort. Many factors can be taken into consideration in connection with regulating venue environmental conditions in accordance with the present invention. For example, and as will be described in greater detail below, such factors include (without limitation): historical occupant comfort levels, occupant preferences, occupant context, ambient conditions inside and outside of the venue, venue or occupant state conditions, venue zones, multiple occupant preferences and comfort, occupant zones, and intersection areas of occupant zones.

The subject disclosure is directed to computer processing systems, computer-implemented methods, apparatus and/or computer program products that facilitate efficiently and automatically (e.g., without direct human involvement) regulating venue environmental conditions utilizing machine learning to help achieve occupant comfort. Humans are also unable to perform the embodiments described here as they include, and are not limited to, performing, e.g., complex Markov processes, Bayesian analysis, or other artificial intelligence based techniques based on probabilistic analyses and evaluating electronic information indicative of occupant comfort, determining whether countless multitudes of probability values assigned to occupant comfort exceed or fall below various probability values.

The computer processing systems, computer-implemented methods, apparatus and/or computer program products employ hardware and/or software to solve tangible problems that are highly technical in nature e.g., an automated processing, determining and/or inferring occupant comfort. For example, a human, or even thousands of humans, cannot efficiently, accurately and effectively manually apply countless thousands of occupant comfort variables to input points and perform analysis to determine that a probability value assigned to an occupant comfort level exceeds a defined probability value.

Various embodiments of the present invention can be employed in connection with determinations and/or inferences. Furthermore, in certain instances trained machine learning models are utilized where determinations are employed while in other instances inferences are employed. In accordance with particular non-limiting implementations the term "determine" ("determining", etc.) is intended to mean ascertain with a particular level of certainty, while the term "infer" ("inferring", etc.) is intended to mean reach a conclusion by reasoning or deduction based on probabilistic-based analyses.

In order to provide for or aid in the numerous inferences described herein (e.g. inferring occupant comfort), components described herein can examine the entirety or a subset of data to which it is granted access and can provide for reasoning about or inferring states of a system, environment, etc. from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, $x=(x1, x2, x3, x4, xn)$, to a confidence that the input belongs to a class, as by $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Social media data is typically noisy, format-free, of varying length, and multimedia. Furthermore, social relations among the entities, or social networks, form an inseparable part of social media data. Accordingly, various statistical and data mining methods implemented herein integrate social theories and research methods coincident with mining such types of complex social data. Some factors that are considered are: (1) exploiting characteristics of social media and use its multidimensional, multisource, and multisite data to aggregate information with sufficient statistics for effective mining; (2) obtaining sufficient samples, e.g., collect data is via application programming interfaces (APIs) from social media sites; (3) successful noise removal that addresses blind removal or noise as well as properly defining what is noise; and (4) evaluating patterns in data. It is to be appreciated that any suitable set of graphs (e.g., null graphs, empty graphs, directed/undirected/mixed graphs, weighted graphs, special graphs, complete graphs, planar graphs, bipartite graphs, regular graphs, bridges, etc.) can be utilized in connection with building models that accurately predict, with high confidence, crowd size expected at a venue. As noted above, the machine learning systems can be explicitly or implicitly trained. For example, over time feedback can be employed to analyze actual number and demographics of attendees versus that predicted by the machine learning system. Accordingly, over time the machine learning systems can converge on higher confidence levels of prediction through such learning.

FIG. 1 illustrates a block diagram of an example, non-limiting system 100 that facilitates utilizing machine learning (or probabilistic modeling) to regulate environmental conditions of a venue to facilitate occupant comfort in accordance with one or more embodiments described herein. Aspects of systems (e.g., non-limiting system 100 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

In various embodiments, system 100 can be any type of mechanism, machine, device, facility, apparatus, and/or instrument that includes a processor and/or is capable of effective and/or operative communication with a wired and/or wireless network. Venues, machines, apparatuses, devices, facilities, and/or instrumentalities that can comprise non-limiting system 100 can include, but are not limited to, concert halls, theaters, arenas, wedding halls, auditoriums, movie theaters, recreational centers, banquet or meeting rooms, dining facilities, ships, airplanes, or any like large venue, . . . and can be implemented at least in part utilizing a variety of devices or appliances including but not limited to tablet computing devices, handheld devices, server class computing machines and/or databases, laptop computers, notebook computers, on-board vehicle computing devices or systems, desktop computers, cell phones, smart phones, consumer appliances and/or instrumentation, industrial and/or commercial devices, hand-held devices, digital assistants, multimedia Internet enabled phones, multimedia players, and the like.

The system 100 can include a bus 102 that can provide for interconnection of various components of the system 100. It is to be appreciated that in other embodiments one or more system components can communicate wirelessly with other components, through a direct wired connection or integrated on a chipset. The system 100 can include one or more sensors (e.g., sensors that detect temperature, pressure, light, image, humidity, pollution, smell, smoke, draft, moisture, air quality, particulate, accelerometers, vibration, noise, tone, weight, etc.) that collect information regarding environments external and/or internal to a venue, occupants and the venue itself and its associated equipment. In some embodiments, a context component 106 can collect and provide contextual data regarding the venue and venue occupants. For example, context information such as what activity (e g, running, swimming, having lunch, sleeping, drinking, etc.) in which an occupant was engaging prior to entering the venue can be determined and/or inferred. Likewise, context information regarding activities of occupant(s) within the venue and/or operational information about the venue can be collected and provided to the system 100 for analysis in connection with regulating venue environment to facilitate occupant comfort.

The context component 106 can for example obtain context information from many different sources e.g., an occupant cell phone, calendar, email, GPS, appliances, third parties, the venue, etc. The system 100 can include a processor 108 and memory 110 that can carry out computational and storage operations of the system 100 as described herein. A crowd estimation component 107 can search and analyze information regarding potential occupants of the venue. The crowd estimation component 107 can, for example, search social media sites to gather information (e.g., number of individuals planning on attending an event at the venue, arrival times, activities conducted prior to arriving, type of transportation, demographics, what they will be wearing, comfort preferences, etc.) regarding potential occupants of the venue. A communications component 112 can provide for transmitting and receiving information, e.g., through one or more internal or external networks 114 (wired or wireless networks). A comfort model component 116 can be an explicitly and/or implicitly trained machine learning component trained to determine and/or infer level of occupant comfort and can determine and/or infer adjustments to environment of the venue to facilitate occupant comfort. A comfort controller component 120 can regulate one or more venue components (e.g., air conditioner, heater, humidifier, de-humidifier, lights, stereo, noise cancellation components, seats, pressure regulators, filters, pumps, motors, seat warmers, seat coolers, etc.) based on output from the comfort model component 116 to facilitate achieving a venue environment conducive to occupant comfort.

In an example, non-limiting implementation, a guest can enter a venue, and the context component 106 can determine from a mobile device of a guest (e.g., via a BLUETOOTH® or other wired or wireless connection) that the guest just finished running a marathon and through respective wearable computing devices that the occupant has an elevated body temperature, and is exhausted. This context information can be shared with the comfort model component 116 which can perform a probabilistic-based analysis on the context information as well as information from the sensor (s) 104, occupants respective preferences and historical data stored in memory, state information and other relevant information that have relevancy to occupant comfort. The comfort model component 116, based in part on the analyses, can output one or more recommendations that can be utilized by the comfort controller component 120 to adjust environmental conditions of the venue to facilitate achieving occupant comfort. For example, the comfort model component 116 based on occupant context information regarding just completing the marathon, having elevated body temperatures, being fatigued can generate an inference that the occupants will need a cooler venue temperature than normal in order to be quickly cooled down and feel comfortable. Additionally, the comfort model component 116 can play relaxing music, and adjust lighting in the venue to effect a calming environment. The context component 106, and sensors 104 can continually collect data that is analyzed by the comfort model component 116 which will generate determinations or inferences regarding level of occupant comfort. The comfort controller component 120 can continually adjust venue environmental conditions to maintain occupant comfort. For example, as the occupants are starting to cool down, the comfort controller component 120 can adjust temperature by raising temperature slightly, reduce force of fans blowing air on occupant, change volume of music, change lighting, etc. Thus, the system 100 is adaptive and can employ closed or open-looped systems to facilitate maintaining occupant comfort even as conditions of the occupant change.

Additionally, capacity of the venue, zones of the venue, and number of occupants are analyzed in connection with regulating environmental conditions. For example, if the venue has capacity for 20,000 people but there will only be 200 occupants at a given time the system 100 can regulate environmental conditions of areas or zones that will be traversed and utilized by the occupants while setting unoccupied zones at different levels in order to conserve resource and energy utilization. Furthermore, estimated arrival and departure times can be factored by the system 100 so that respective venue zones to be occupied are regulated in advance of arrival and the same areas are regulated as a function of departure time.

The system 100 can also provide information bi-directionally. For example, sometimes occupants can be unsure as to what the temperature is like in a venue (e.g., a cold movie theater) and not know whether to bring a sweater or how to properly dress. The system 100 can provide notifications via the communications component 112 to occupants in advance of an event (e.g., the temperature at the movie theater will be 72 degrees) which will allow for the occupant to dress appropriately.

The system 100 includes a profile component 122 that builds and stores in memory 110 venue occupant comfort profiles. A season ticket holder associated with a venue is commonly a frequent user of the venue, and the comfort model component 116 can build a specific model for the patron as well as respective models for other frequent occupants (e.g., family members, close friends, . . . ). Upon identification of an occupant having entered the venue, e.g., via facial recognition, seating pattern (e.g., body contours, weight, etc.), biometrics, voice recognition, iris recognition, cell phone, or any other suitable means for identification and authentication, the profile component 122 can access specific profiles for each occupant of the venue that can be utilized by the comfort model component 116 to generate determinations or inferences regarding occupant comfort level and generating recommendations to the comfort controller component 120 to adjust environment of the venue including respective zones to achieve occupant(s) comfort. It is to be appreciated that when multiple occupants are in the venue, their respective profiles may conflict in certain aspects, e.g., temperature preference, volume preference, music preference, lighting preference, etc.

The comfort model component can utilize the respective profiles and specific occupant models to achieve a happy medium that achieves levels of comfort suitable for most or all occupants. A utility-based analysis can also be employed where the costs of taking a certain action are weighed against the benefits. For example, if a lecturer desires that his students have a high level of attention, the system 100 can regulate venue environment (e.g., a bit cooler) to facilitate focus of attention. The comfort model component 116 can also generate recommendations to the comfort controller to adjust environment of respective zones of the venue differently based on occupants within each zone.

Likewise, if the event is a wedding the system 100 can adjust environmental conditions to account for changing themes at the event. For example, the environment may be set at a certain point during a cocktail reception where people are standing and mingling, then a second setting when seated for dinner, and yet a third setting when occupants are dancing after dinner. The system 100 based on contextual information gathered regarding occupants, the event, zones, preferences, activities can dynamically adjust venue environment to facilitate achieving continued occupant comfort as well as efficient utilization of venue resources.

In an embodiment, the system 100 includes a pattern recognition component 126. A set of the sensors 104 can include cameras that collect image data inside and outside of the venue. The pattern recognition component 126 can be employed to identify occupants, collect facial expression information that can be analyzed by the comfort model component 116 to assess state of occupant(s), e.g., tired, hot, cold, sleepy, alert, sad, happy, nervous, stressed, etc. Based on such determination or inference, the comfort model component 116 can generate recommendations to the comfort controller component 120 to adjust venue environment. Additionally, the pattern recognition component 126 can facilitate determining venue conditions, e.g., temperature, humidity levels, etc. The pattern recognition component 126 can detect outside environmental activity, e.g., traffic, weather, pedestrians, moving objects, etc. that can be utilized by the comfort model component 116 to instruct the venue to regulate environment.

Figure 2:
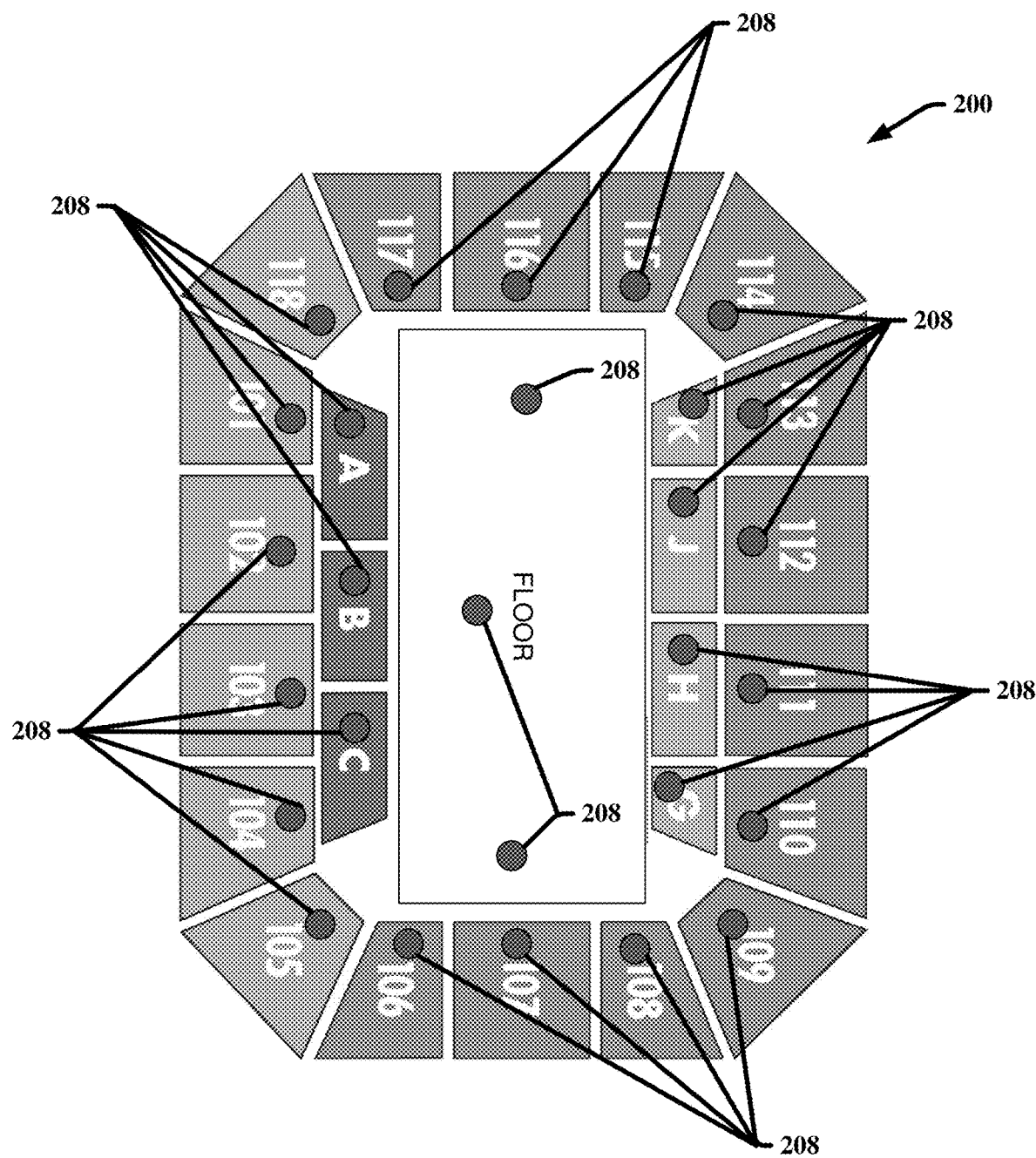
FIG. 2 illustrates a schematic block diagram of an example venue that utilizes systems in accordance with one or more embodiments described herein.

With reference now to FIGS. 1 and 2 in conjunction, an example, non-limiting, schematic representation of a venue interior 200 is illustrated. The interior 200 includes a set of occupant seats in respective zones 101-118, A-K, and the floor that can include sensors 208 (e.g., weight, temperature, moisture, etc.) and environmental comfort components (e.g., seat heaters, coolers, massage components, seat adjustment components, vents, blowers, air conditioning, heaters, ventilation, etc.) that can be regulated by the comfort model component 116 to facilitate occupant comfort. Sensors 208 can also be situated about the venue to collect other information e.g., video information. Vents/blowers (not depicted) can be situated throughout the venue to facilitate temperature regulation as well as humidity. Additional sensors (not depicted) can be located at various locations within and outside of the venue. Sensors can collect information regarding state of the venue and/or occupants (e.g., temperature, light, moisture, pressure, weight, ice formation, noise, etc.). As discussed above, the venue can be divided into respective zones (e.g., 101-118, A-K, and the floor) and information regarding the respective zones and occupants therein can be collected (e.g., via sensors 104, 208 and context component 106) and the collected information analyzed by the comfort model component 116 to infer or determine respective occupant comfort in the zones. Based on the inference or determination, the comfort model component can direct the comfort controller component 120 to adjust environmental conditions (e.g., seat position, seat temperature, blower intensity, zone temperature, zone moisture level, zone noise level, music volume, zone lighting, massage, wireless signal strength, air conditioning, heating, ventilation, etc.) in respective zones to facilitate occupant comfort in each zone. For example, a family enters the venue 200 and the context component 106 can determine that the family is attending a hockey game. The sensors 104, 208 along with pattern recognition component 126 can facilitate identifying which family member is seated in a particular seat. The comfort model component 116 can utilize profiles generated by the profile component 122 to generate inferences and determinations regarding suitable environmental conditions for each passenger in their respective zones to facilitate comfort for each family member. Based in part on output from the comfort model component 116, the comfort controller component 120 can adjust the zone or sub-section thereof respectively to facilitate occupant comfort, e.g., regulate temperature and humidity in each zone, control volume, wireless strength, etc. per aggregated occupant preference. The system 100 can continually monitor occupant state, context and comfort levels and dynamically adjust environmental conditions. For instance, if the occupants are inferred or determined to be losing interest, the comfort controller component 120 can decrease temperature, increase lighting, increase volume, etc. to facilitate maintaining occupant alertness or focus of attention.

It is to be appreciated that various example, non-limiting body and contextual parameters (e.g., blood pressure, heart rate, pulse, skin temperature, respiratory rates, skin humidity, blood oxygen saturation, in/out venue air temperature, in/out venue humidity, venue light intensity, venue noise levels) that can be utilized to assess occupant comfort and regulate venue comfort facilities. A model can be built for inferring individual occupant comfort degree based on his/her body parameters and contextual parameters, and the model can also infer or determine comfort of a group of occupants as well. The model can analyze contextual parameters that damage occupant(s) comfort when occupant(s) analyzed are determined or inferred to be un-comfortable. Venue facilities can be adjusted appropriately to improve upon the damaging contextual parameters and occupant comfort degree change can be utilized as feedback for optimization.

In one example, the entire venue (e.g., all zones) are predicted to be occupied. The system 100 can adjust venue environment for all zones to facilitate occupant comfort upon expected arrival time. In another example, only zone B will be utilized for an event. In such smaller event instance, the system can keep temperatures other than zone B and associated ingresses and egresses at higher, unoccupied environmental levels and focus on environmental regulation in connection with zone B to afford comfort to the occupants therein.

Figure 3:
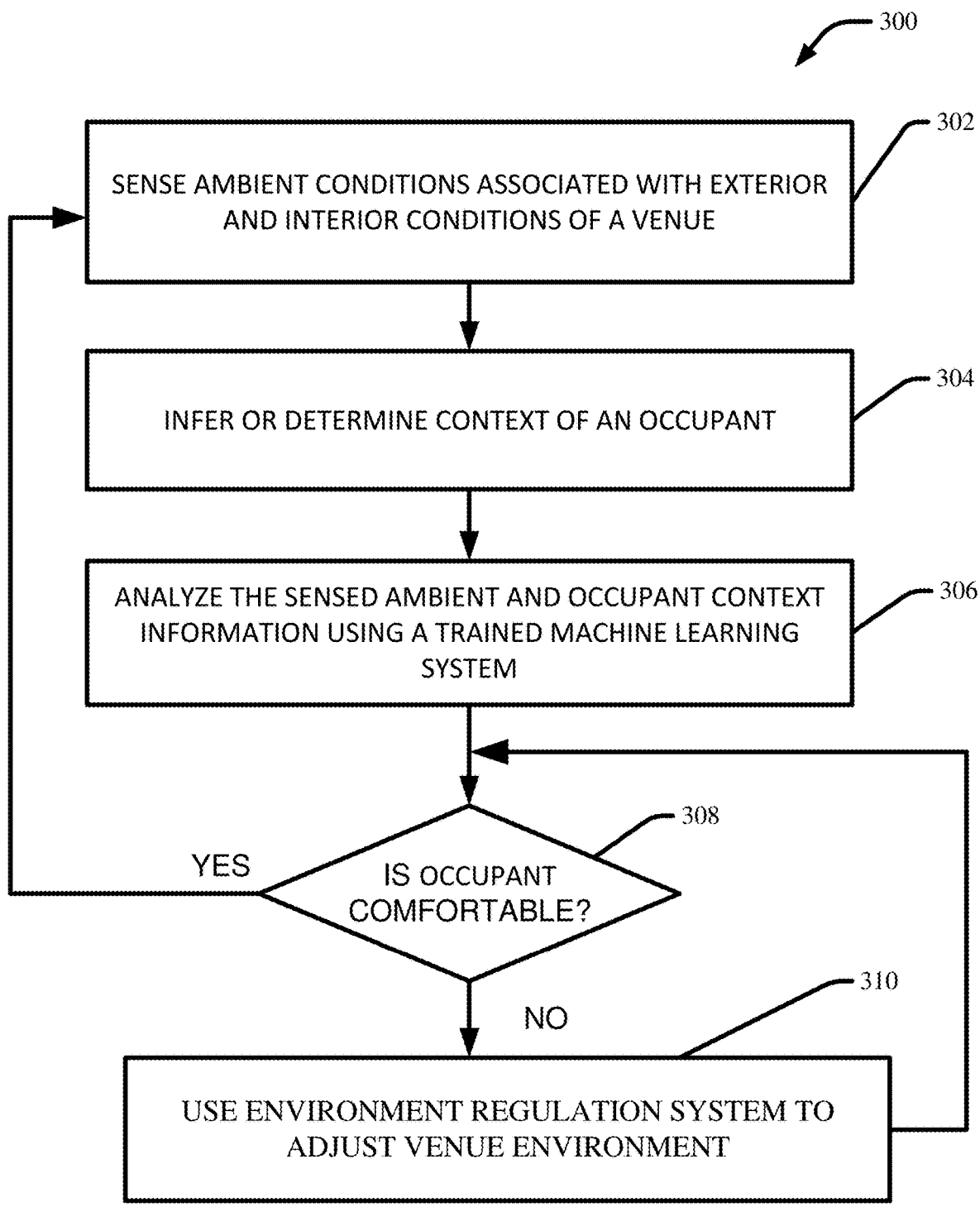
FIG. 3 illustrates an example flow diagram of a method in accordance with one or more embodiments described herein.

FIG. 3 illustrates a flow diagram of an example, non-limiting computer-implemented method 300 that facilitates venue occupant comfort in accordance with one or more embodiments described herein. The methodology can be employed in connection with dynamic action and/or predictive action. Repetitive description of like elements employed in other embodiments described herein is omitted for sake of brevity.

At 302, ambient conditions associated with exterior and interior conditions of a venue are sensed, including but not limited to sensed information associated with the venue and/or occupants of the venue. For example, sensed information may include one or more of ambient temperature, light levels, odors, smoke, pollutants, allergens, pressure, moisture, sound levels, noise levels, and weather conditions.

At 304, occupant context can be determined or inferred (e.g., via a context component 106). For example, occupant context can include prior activities, current activities, stress level, emotional state, destination, upcoming events, attire, alertness, fatigue level, sleepiness level, focus of attention, mood, health state, etc. Extrinsic or intrinsic information regarding an occupant can be collected from a variety of sources (e.g., cell phones, social network sites, GPS, email, text messages, calendars, appointments, wearable computing devices, cloud-based services, 3rd parties, the venue, etc.).

At 306 the sensed information and occupant context information are analyzed using a trained machine learning system (e.g., comfort model component 116).

At 308 a determination or inference is made regarding whether or not the occupant is comfortable. For example, a comfort index can be utilized to assess whether the occupant is comfortable or if comfort can be improved upon. If Yes, the process returns to 302. If No, at 310 an environmental regulation system (e.g., comfort controller component 120) is utilized to adjust environmental conditions until the occupant is deemed or inferred to be comfortable.

Figure 4:
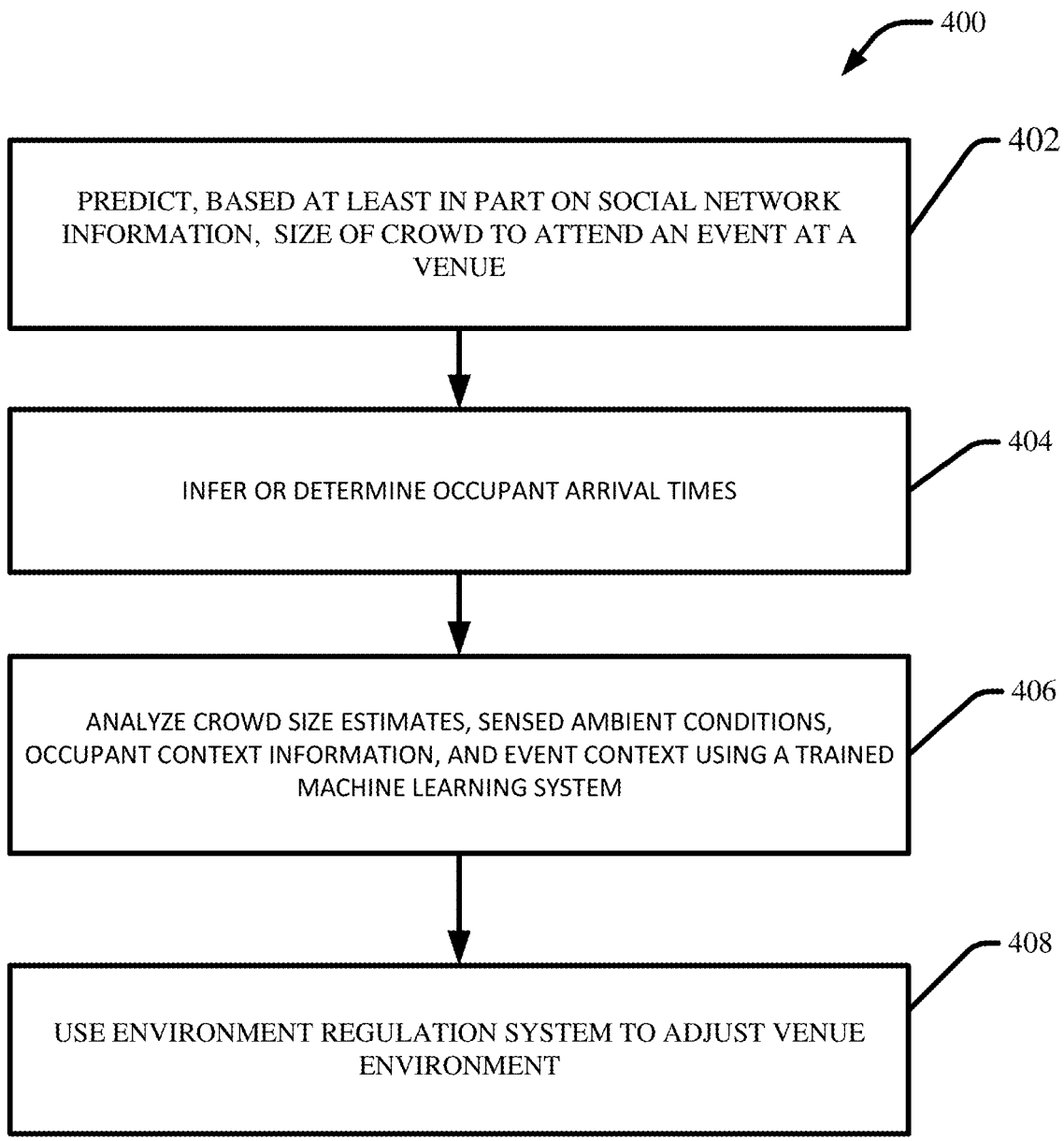
FIG. 4 illustrates another example flow diagram of a method in accordance with one or more embodiments described herein.

FIG. 4 illustrates a flow diagram of an example, non-limiting computer-implemented method 400 that facilitates venue occupant comfort in accordance with one or more embodiments described herein. The methodology can be employed in connection with dynamic action and/or predictive action.

At 404, an inference or determination is made regarding occupant arrival times (e.g., using crowd estimation component 107).

At 406, a prediction is made, based at least in part on social network information regarding the size of crowd expected to attend an event (e.g., using crowd estimation component 107). In some embodiments, sensed ambient conditions, occupant context information and event context using a trained machine learning system are also factored in (e.g., using comfort model component 116).

At 408, adjustments are made to the venue environment (e.g., using comfort controller component 120).

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

In order to provide additional context for various aspects of the disclosed subject matter, FIG. 5 as well as the following discussion are intended to provide a general description of a system 500 in which various aspects of the disclosed embodiments shown and described in connection with FIGS. 1-4 can be implemented. In some embodiments, for example, system 500 can implement a method stored in memory and/or other computer readable/executable storage such as a computer program product (an example of which is described in more detail below) that facilitates venue occupant comfort in accordance with one or more embodiments described herein. The methodology can be employed in connection with dynamic action and/or predictive action. Ambient conditions associated with exterior and interior conditions of a venue are sensed, including but not limited to sensed information associated with the venue and/or occupants of the venue. For example, sensed information may include one or more of ambient temperature, light levels, odors, smoke, pollutants, allergens, pressure, moisture, sound levels, noise levels, and weather conditions. Occupant context can be determined or inferred. For example, occupant context can include prior activities, current activities, stress level, emotional state, destination, upcoming events, attire, alertness, fatigue level, sleepiness level, focus of attention, mood, health state, etc. Extrinsic or intrinsic information regarding an occupant can be collected from a variety of sources (e.g., cell phones, social network sites, GPS, email, text messages, calendars, appointments, wearable computing devices, cloud-based services, 3rd parties, the venue, etc.). The sensed information and occupant context information are analyzed using a trained machine learning system. A determination or inference is made regarding whether or not the occupant is comfortable. For example, a comfort index can be utilized to assess whether the occupant is comfortable or if comfort can be improved upon. If Yes, the methodology is repeated. If No, an environmental regulation system is utilized to adjust environmental conditions until the occupant is deemed or inferred to be comfortable.

Figure 5:
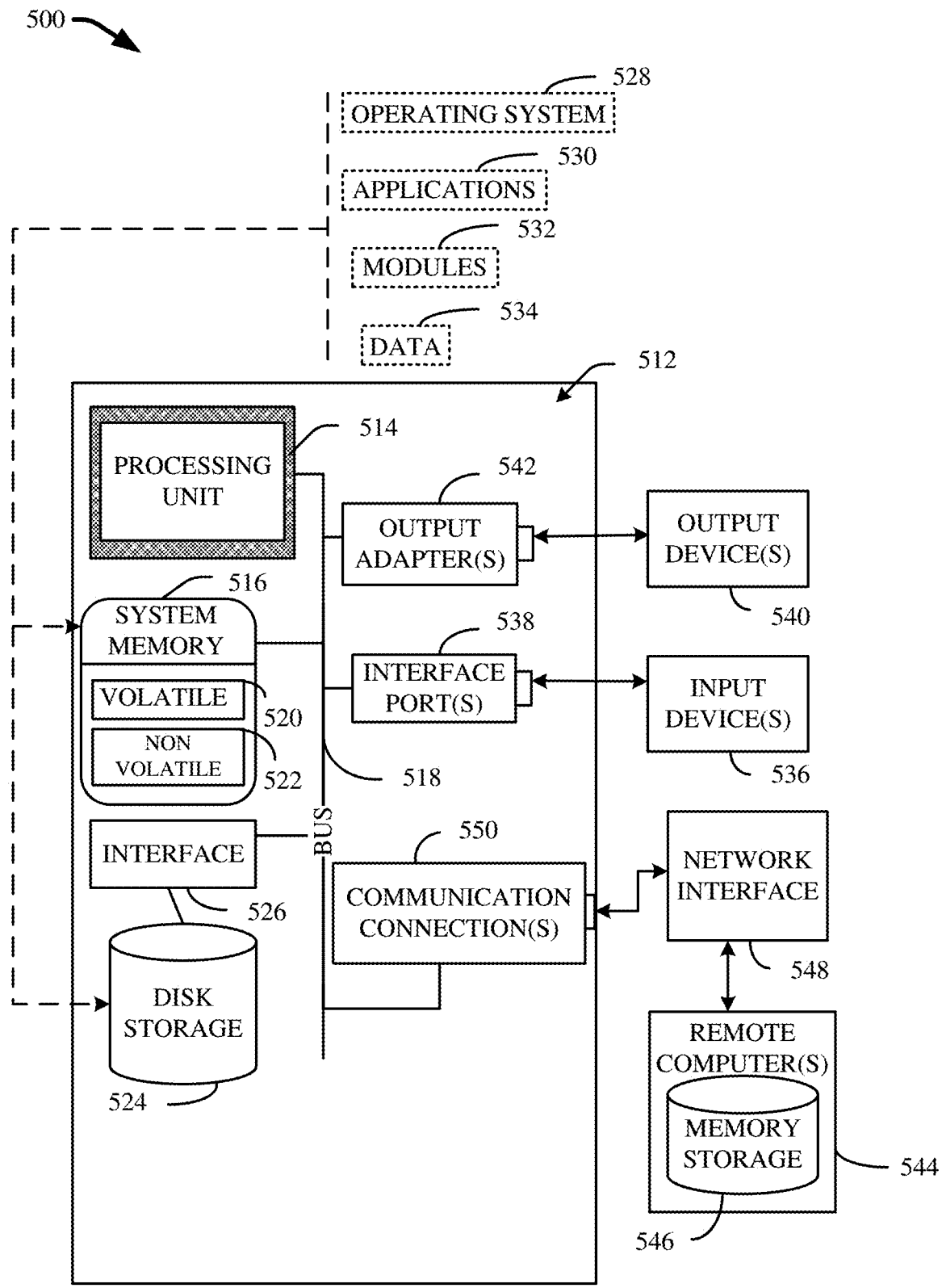
FIG. 5 illustrates a block diagram of an example, non-limiting system in accordance with one or more embodiments described herein.

With reference now to FIG. 5, a suitable operating environment 501 for implementing various aspects of this disclosure can also include a computer 512. The computer 512 can also include a processing unit 514, a system memory 516, and a system bus 518. The system bus 518 couples system components including, but not limited to, the system memory 516 to the processing unit 514. The processing unit 514 can be any of various available processors. Dual microprocessors and other multiprocessor architectures also can be employed as the processing unit 514. The system bus 518 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 516 can also include volatile memory 520 and nonvolatile memory 522. The basic input/output system (BIOS), containing the basic routines to transfer information between elements within the computer 512, such as during start-up, is stored in nonvolatile memory 522. By way of illustration, and not limitation, nonvolatile memory 522 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 520 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 512 can also include removable/non-removable, volatile/nonvolatile computer storage media. FIG. 5 illustrates, for example, a disk storage 524. Disk storage 524 can also include, but is not limited to, devices like a magnetic disk drive, floppy disk drive, tape drive, Jaz drive, Zip drive, LS-100 drive, flash memory card, or memory stick. The disk storage 524 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 524 to the system bus 518, a removable or non-removable interface is typically used, such as interface 526. FIG. 5 also depicts software that acts as an intermediary between users and the basic computer resources described in the suitable operating environment 501. Such software can also include, for example, an operating system 528. Operating system 528, which can be stored on disk storage 524, acts to control and allocate resources of the computer 512. System applications 530 take advantage of the management of resources by operating system 528 through program modules 532 and program data 534, e.g., stored either in system memory 516 or on disk storage 524. It is to be appreciated that this disclosure can be implemented with various operating systems or combinations of operating systems. A user enters commands or information into the computer 512 through input device(s) 536. Input devices 536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 514 through the system bus 518 via interface port(s) 538. Interface port(s) 538 include, for example, a serial port, a parallel port, a game port, and a universal serial bus (USB). Output device(s) 540 use some of the same type of ports as input device(s) 536. Thus, for example, a USB port can be used to provide input to computer 512, and to output information from computer 512 to an output device 540. Output adapter 542 is provided to illustrate that there are some output devices 540 like monitors, speakers, and printers, among other output devices 540, which require special adapters. The output adapters 542 include, by way of illustration and not limitation, video and sound cards that provide a means of connection between the output device 540 and the system bus 518. It should be noted that other devices and/or systems of devices provide both input and output capabilities such as remote computer(s) 544.

Computer 512 can operate in a networked environment using logical connections to one or more remote computers, such as remote computer(s) 544. The remote computer(s) 544 can be a computer, a server, a router, a network PC, a workstation, a microprocessor based appliance, a peer device or other common network node and the like, and typically can also include many or all of the elements described relative to computer 512. For purposes of brevity, only a memory storage device 546 is illustrated with remote computer(s) 544. Remote computer(s) 544 is logically connected to computer 512 through a network interface 548 and then physically connected via communication connection 550. Network interface 548 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 550 refers to the hardware/software employed to connect the network interface 548 to the system bus 518. While communication connection 550 is shown for illustrative clarity inside computer 512, it can also be external to computer 512. The hardware/software for connection to the network interface 548 can also include, for exemplary purposes only, internal and external technologies such as, modems including regular telephone grade modems, cable modems and DSL modems, ISDN adapters, and Ethernet cards.

Embodiments of the present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and number-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms (such as in the examples provided above). Additionally, the disclosed memory components of systems or computer-implemented methods herein are intended to include, without being limited to including, these and any other suitable types of memory.

What has been described above include mere examples of systems, computer program products and computer-implemented methods. It is, of course, not possible to describe every conceivable combination thereof for purposes of describing this disclosure, but one of ordinary skill in the art can recognize that many further combinations and permutations are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transition word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    sensing, by a device operatively coupled to a processor, ambient conditions of a venue;
    building, by the device, comfort profiles for occupants of a venue, wherein at least one of the comfort profiles contains one or more comfort preferences of an occupant learned from social media data mining, wherein the one or more comfort preferences comprise at least one of temperature preference, volume preference, music preference, or lighting preference; and
    adjusting, by the device, one or more environmental conditions of a zone of the venue based on the ambient conditions of the venue and the at least one of the comfort profiles.

2. The computer-implemented method of claim 1, further comprising sensing, by the device, body temperature of the occupant.

3. The computer-implemented method of claim 1, further comprising inferring, by the device, occupant action prior to entering the venue.

4. The computer-implemented method of claim 1, further comprising inferring, by the device, an amount of clothing worn by the occupant.

5. The computer-implemented method of claim 1, further comprising inferring, by the device, an optimal environmental condition suitable for a majority of the occupants of the venue.

6. The computer-implemented method of claim 1, further comprising employing, by the device, facial recognition using a pattern recognition component to infer a comfort level of at least one of the occupants, and wherein the inference is based on one or more facial expressions.

7. A computer program product, the computer program product comprising a computer readable storage medium having program instructions embodied therewith, the program instructions executable by a processor to cause the processor to:
    sense ambient conditions of a venue;
    build comfort profiles for occupants of a venue, wherein at least one of the comfort profiles contains one or more comfort preferences of an occupant learned from social media data mining, wherein the one or more comfort preferences comprise at least one of temperature preference, volume preference, music preference, or lighting preference; and
    adjust one or more environmental conditions of a zone of the venue based on the ambient conditions of the venue and the at least one of the comfort profiles.

8. The computer program product of claim 7, wherein the program instructions are further executable by the processor to cause the processor to:
    sense body temperature of the occupant.

9. The computer program product of claim 7, wherein the program instructions are further executable by the processor to cause the processor to:
    infer occupant action prior to entering the venue.

10. The computer program product of claim 7, wherein the program instructions are further executable by the processor to cause the processor to:
    infer an amount of clothing worn by the occupant.

11. The computer program product of claim 7, wherein the program instructions are further executable by the processor to cause the processor to:
    infer optimal environmental condition suitable for a majority of the occupants of the venue.

12. The computer program product of claim 7, wherein the program instructions are further executable by the processor to cause the processor to:
    employ facial recognition using a pattern recognition component to infer a comfort level of at least one of the occupants, and wherein the inference is based on one or more facial expressions.

13. A system for adjusting the environmental conditions of a venue, the system comprising:
    a memory storing one or more computer readable and executable components;
    a processor operably coupled to the memory and that executes the computer readable and executable components stored in the memory;
    the components comprising:
        a sensor that senses ambient conditions of a venue;
        a comfort model component that builds comfort profiles for occupants of a venue, wherein at least one of the comfort profiles contains one or more comfort preferences of an occupant learned from social media data mining, wherein the one or more comfort preferences comprise at least one of temperature preference, volume preference, music preference, or lighting preference; and
        a comfort controller that adjusts one or more environmental conditions of a zone of the venue based on the ambient conditions of the venue and the at least one of the comfort profiles.

14. The system of claim 13, wherein the sensor also senses body temperature of the occupant.

15. The system of claim 13, further comprising a crowd estimation component that infers occupant action prior to entering the venue.

16. The system of claim 13, further comprising a crowd estimation component that infers an amount of clothing worn by the occupant.

17. The system of claim 13, further comprising a crowd estimation component that infers optimal environmental condition suitable for a majority of the occupants of the venue.

18. The system of claim 13, further comprising a profile component that employs facial recognition using a pattern recognition component to infer a comfort level of at least one of the occupants.

19. The system of claim 18, wherein the inference is based on one or more facial expressions.

20. The system of claim 18, further comprising a crowd estimation component that infers context of an event associated with the venue, wherein the inference employs use of a trained machine learning system.

* * * * *